Sept. 1, 1931.  A. D'HALLOY  1,820,965
LOCK NUT
Filed Aug. 6, 1927

INVENTOR
Audoin d'Halloy,
BY
F. Hutchinson
ATTORNEY

Patented Sept. 1, 1931

1,820,965

UNITED STATES PATENT OFFICE

AUDOIN D'HALLOY, OF PARIS, FRANCE, ASSIGNOR TO INTERNATIONAL SAFETY LOCK NUT CORPORATION, OF NEW YORK, N. Y., A CORPORATION OF DELAWARE

LOCK-NUT

Application filed August 6, 1927, Serial No. 211,236, and in France February 9, 1927.

This invention relates to an improved lock nut arrangement.

One feature of the invention has for its object method and means whereby an internally threaded member such as a nut may be securely associated with an externally threaded member such as a bolt so that the joint so formed will not become loosened when one or both of said members are subjected to vibrational forces while still permitting the loosening of the joint at will without causing any deleterious deformation of the members which might tend to prevent the repeated association of such members in the intended manner.

More specifically there is provided in accordance with the invention resilient means adapted to cooperate with a resilient part or parts of the nut upon the latter being screwed home to hold threads of the nut against threads of the bolt by a radial elastic stress of such a value and character that vibrational forces communicated to the assembly will not effect a loosening between the respective threads of the nut and bolt.

The invention is hereinafter described and defined in the annexed claims and is illustrated diagrammatically in the accompanying drawings in which:

Figure 1:
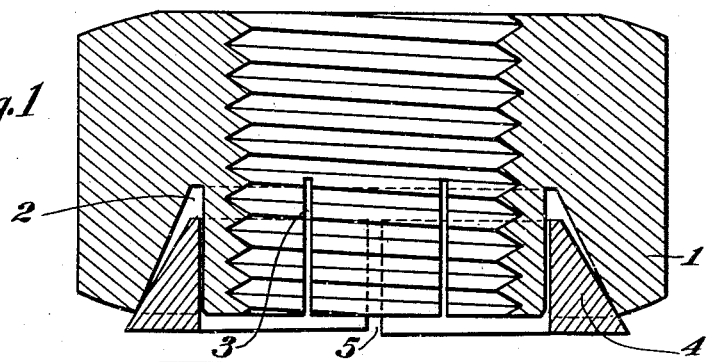
Figure 1 is a vertical section through the nut and its cooperating resilient ring.

In Figure 1 the nut 1 is shown as having an annular groove 2 which in this case is concentric with the bolt hole. The inner wall of the groove is substantially parallel to the longitudinal axis of the nut, while the outer wall of the groove is at angle to such axis; this angle being such that the distance between the exterior of the nut and the groove gradually increases from the surface of the nut. Thus, the groove is wedge shaped, the smaller end being inside the nut. The centrally located sleeve like portion between the inner wall of the groove and the bolt hole is rendered radially resilient by means of axially disposed grooves 3.

Figure 2:
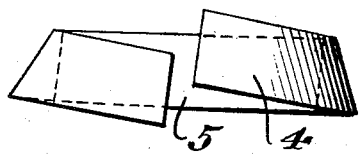
Figure 2 is an elevational view of the ring 4 as shown in Fig. 1.

The ring or washer 4 is helicoidal in shape and is split, as shown by the break in its surface continuity at 5. Figure 2 is an elevational view of the washer in which the helicoidal shape is clearly seen. In this respect the washer resembles the so-called Grover (called "Grower" in the French language) washer or spring washer which is commonly used to exert an axial thrust on the nut threads to bring the latter into more intimate contact with the bolt threads than they otherwise would be.

The washer 4 is wedge shaped, somewhat similar in that respect to the groove 2. While it may be said in general that the profiles of the groove and washer correspond, the washer is so fashioned that it will only engage with a comparatively small part of the outer wall of the groove when it is inserted therein. On the other hand, the washer engages the surface of the inner wall of the groove uniformly and over substantially its entire area with the exception of its upper part. The groove is made somewhat deeper than the height of the washer which is to be permitted to penetrate in the body of the nut. The reason for this will appear from the description given hereinbelow of the operation of the parts as the nut is screwed home.

The surface of the washer which engages the part against which the nut is tightened may be roughened and is preferably such that it will rest uniformly thereon, and if such part is at an angle or not exactly level (as will appear from the description of Figure 4 hereinafter) then the surface of the washer may be correspondingly designed. In Figure 1 it is assumed that the part is level and at right angles to the axis of the bolt so that the surface of the washer is made to fit the part in a uniform manner.

Figure 3:
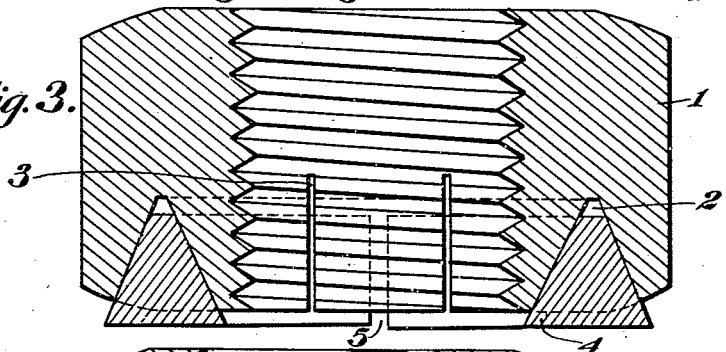
Figure 3 is a similar view of a nut and a ring of different form.

The outside diameter of the washer is preferably greater than the outside diameter of the groove although coming within the confines described by the outer surfaces of the nut, so as to give the washer an adequate bearing area against the part upon which it rests. Figure 3 illustrates the use of a washer of slightly different cross-section, but otherwise the arrangement is much similar to that shown in Figure 1.

Figure 4:
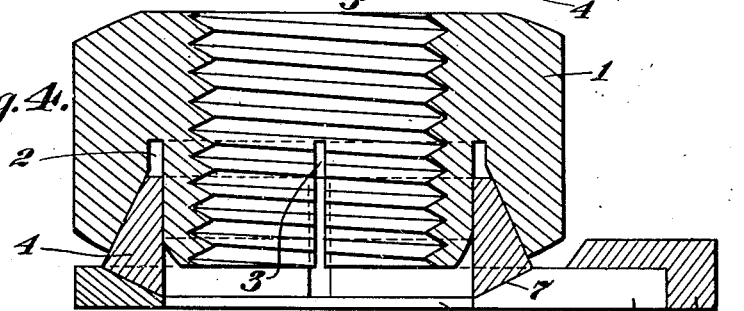
Figure 4 illustrates the use of a bearing ring.
Figure 5:
Figure 5 is an end elevation of the bearing ring and its clamp.
Figure 6:
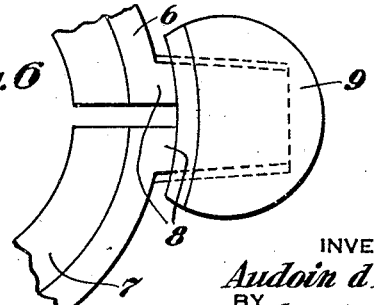
Figure 6 is a partial plan view of the bearing ring of Fig. 4.

Figure 4 is illustrative of a modification wherein an auxiliary locking member is employed to hold tightly the part of the washer which lies outside the nut. This auxiliary member is indicated by the reference 6 in the drawings and is preferably split and whose bearing face may be smooth or roughened. The member 6 has a conical seating 7, and it is against this seating that the washer 4 is adapted to rest. In order to make a desirable surface contact, therefore, the surface of the washer 4 is fashioned so that when the assembly has been tightened it substantially uniformly engages the conical seating.

The auxiliary member is provided with extensions 8, about which a clamp 9 is adapted to be tightened. This tightening is effected after the nut has been screwed home. The clamp or gripping member may be provided with grooves 10 adapted to engage flanges 11 of the extensions 8.

A description of the relative movements of the constituent members during the assembling operation will now be given with special reference to Figure 1.

As heretofore pointed out Figure 1 shows the arrangement in its completely assembled form after the nut has been screwed home. As the washer is normally in a helicoidal shape, it cannot be initially inserted into the groove to the extent that it will subsequently go under pressure. It can, if desired, however, be thrust into the groove slightly, and to an extent sufficient to enable a workman to put the nut and washer on the bolt just as though they were in fact one piece. Owing to the relative shape of the groove and the washer surfaces, the washer will, when undergoing tightening assume its correct position, even though it may engage the groove unevenly at the start.

As the wrench is applied, the outer surface of the groove bears on the outer surface of the washer and the washer gradually becomes depressed in an axial direction. Such depression causes the washer to exert an axial thrust against the nut, as it always has the tendency to revert to its normal helicoidal form.

The wedging now comes into play. The nut in being forced down on the washer holds the washer tightly within its groove, and provides only two directions of continuing movement. The first of these is the axial direction, made possible by the fact that the groove is designed deep enough so that the washer cannot, even in its extreme position, engage the bottom of the groove. The second direction may aptly be termed a radial one since it is toward the surfaces of the bolt threads.

By visualizing the effect of continued pressure of the nut against the outer surface of the washer as it would take place in arriving at the assembly of Figure 1, it will be clear that the axial thrust is progressively partially transformed into a radial thrust which causes the inner wall of the washer to close in on the inner wall of the groove. Gradually therefore the sleeve like portion of the nut between the groove and the nut threads, which is resilient, tends to close in on the bolt threads. This action continues until, by reason of the relative shapes of the groove and washer surfaces, the nut has reached the position which it should have in order to give the desired axial tightness; and at this time the radial stress has reached a value which will prevent the nut from being moved any further in the axial direction by the continued application of the force which is the correct one to be applied in a given case.

It might be mentioned here that for a given bolt and nut, in order to avoid inefficient or excessive tightening, a wrench of certain characteristics should be employed. If the wrench is too short then the required force cannot be exerted by the hands of the workman and the joint will not be of the required tightness. On the other hand, if the wrench is too long or leverage means added to the normal length of the wrench to make it longer, then too much force is applied and stripping of the threads is likely to take place.

In the arrangement provided by the present invention greater leverage may be applied to the wrench than would be permissible in the case of ordinary nuts or nuts used with the ordinary Grover type of washer, for example, because of the added resistance to the turning of the nut due to the inner radial thrust which is effected as described above. This is a very important advantage because it practically prevents the bolt from being elongated. The elongation of a bolt is an effect which cannot be remedied, unless a new bolt is provided, but oftentimes the workman, in the case of the ordinary type of nut arrangements heretofore used, does not realize that he has in fact elongated the bolt in the tightening operation and believes he has effected a tight joint. Subsequently, when the assembly is subjected to vibrations, the weakened bolt gives way and damage results. As shown herein such damage is obviated by the use of the present invention.

It will be clear that in the embodiment shown threads on the nut will closely engage threads on the bolt in substantially uniform manner, and thus greatly strengthen the joint to beyond the point which could be arrived at when arrangements of the prior art are employed. The threads on commercial bolts and nuts are not always exactly true, and with a given bolt, there may be more or less play between the nut threads and the bolt threads depending upon the particular character of such threads. The present invention overcomes this difficulty, because the action is such that the play between the threads in ordinary commercial bolts and nuts may be taken up and a tight joint effected.

Furthermore, there is no particular need to use extreme care in fashioning the walls of the groove and those of the washer in order to ensure inter-changeability of parts. In other words, ordinary commercial methods of manufacture in use today are quite sufficient to produce the desired groove and washer surfaces with complete assurance that they will cooperate effectually one with the other. The washer being of tempered material for example such as is the case with the ordinary Grover washer, and the nut being of softer material, it will be clear that under the effect of the tightening action, the washer will fashion for itself a suitable and proper seating within the nut.

In a nut and bolt assembly wherein the ordinary Grover type of washer is used, one edge of the washer tends to dig into the surface of the part upon which it rests and another edge thereof tends to dig into the surface of the nut, when the assembly is subjected to vibrational or other forces. Rotary movement of the washer and nut is thus retarded, but in such an arrangement the bolt is still free to move relative to the nut. One edge of the washer in Figure 1 will also tend to dig into the surface of the part on which it rests when subjected to similar forces and thus retards the rotary movement of the washer and nut, but in this case the bolt is not free to move under the effect of further vibrations as it is locked to the nut by radial forces as described above. In this case also another edge of the washer will tend to penetrate further into the groove by reason of the inherent axial elasticity of the washer and/or to dig into the surface of the segments forming the sleeve-like portion of the nut.

It will be clear from the drawings that should the washer become broken while in use, although the axial stress may become lessened, the radial stress is either not effected or may be strengthened due to the increase in the number of indentations which will be made in the surface of the part on which the washer rests by the edges of the broken sections. Moreover, the broken sections will be held tightly in place in the annular groove.

In addition to the radial forces exerted over the area covered by the inner surface of the washer, there exists also a radial force, transmitter through the body of the nut from the engaging surface or point on the outer surface of the washer, which tends to cause the nut to grip tightly onto the bolt threads which lie toward the end surface of the nut away from that engaging the washer.

Referring to Figure 4, the action is much the same as has already been described in connection with Figure 1, but by reason of the provision of the auxiliary locking member which is caused to be tightly clamped together after the nut has been screwed home, the radial force between the nut and bolt threads is greatly increased over that attainable by merely the transformation of the axial force resulting from the screwing down of the nut.

The nut lock arrangement of the invention may be removed by unscrewing the nut with a wrench just as rapidly as can be done when ordinary nuts are used.

An elastic joint attained by the employment of vibration absorbing means, is thus secured by the use of the present invention. In cases where the vibration to which the assembly is subjected, is considerable and of a continuing nature, there is likely to be some wear of the associated parts, for example when ordinary iron is employed. The forces which are holding the tight joint, however, are elastic in character and therefore will respond to readjust the assembly to the new conditions after the wear has taken place and prevent loosening between the parts in that the higher terminal of the elastic ring has a tendency to provide a dead lock action in conjunction with a contiguous radial edge of the segments in the event that the higher free terminal of the elastic ring has moved to register with a striation between the segments so that the radial edge of the higher terminal overlaps slightly a radial edge of a contiguous segment whereby any tendency of the nut to loosen is prevented. In other words to the wedging effect preceded there may be added the butting effect of the higher terminal of the elastic washer clamped in the groove of the screw against one of the radial edges of the segments and upon which are exerted radial forces contributing to prevent the nut from unlocking. Were the joint made by a rivet, or by means of a lock nut arrangement having insufficient or no elasticity, such as in the case of deformed thread joints, either produced after assembly or by the use of specially designed threads, it is clear that once wear has taken place the associated parts are ineffective to maintain the joint.

The resilient association is also of great advantage to accommodate the joint to respond to change of temperature which is a factor which has to be taken into account in places subject to extreme heat and cold.

The nut lock arrangement is applicable generally for use in all cases where nuts and bolts are usually employed and does away with the necessity of so-called cotter pins and other expensive types of lock arrangements and gives added advantages and greater security than those formerly employed can give. But particularly the invention is of considerable value in cases where joints must be held tighly even when subject to vibrational forces of considerable magnitude, such as might be encountered in moving vehicles, railroad tracks and the like.

While reference in the claims is made to a "nut" and to a "bolt" it is recognized that the invention may be applied to arrangements wherein the parts carrying the threads may not physically correspond in all respects to the exact articles usually defined by such terms. The use of these terms in the claims is for the sake of clearness rather than by way of limitation.

What I claim is:

1. In a nut and bolt assembly a nut a plurality of shiftable sections thereon and a resilient member, said nut and said member having engaging surfaces such that when the nut is screwed home the resilient member causes said shiftable sections to exert a wedging action and maintains the nut and the work in separated relation.

2. In a nut and bolt assembly, means for effecting through the intermediary of a split resilient member which is adapted to enter into part of a cavity in the nut and co-operate with an internally threaded compressible sleeve portion of the nut, a radial and axial resilient thrust causing the screw threads of the sleeve portion to grip the screw threads of the bolt.

3. A device for maintaining a joint between a plurality of parts which comprises first, second and third members, the said first member being provided with shiftable sections having screw threads a portion of which is adapted to be radially displaced upon being tightened when being screwed home against said third member upon said second member, said third member penetrating into said first member and being so fashioned that it is both axially and radially resilient to maintain the first member and the work in separated relation.

4. A locking device for bolts and the like comprising a nut having a groove and slots forming one end with inner screwed segments and an outer surrounding wall and a split helicoidal resilient member adapted to engage the groove and to co-act with the screwed segments.

5. A nut lock comprising at least a screw member, a locking member and an auxiliary locking member, the screw member having a threaded hole to engage a bolt and a compressible portion, the locking member being split and resilient and associated with the screw member to grip said compressible portion and the auxiliary member being adapted to grip said locking member.

6. A nut lock arrangement comprising a resilient split ring wedge-shaped in cross section and adapted to co-operate with a resilient threaded sleeve portion of the nut in such manner that when the nut is screwed home on a bolt the said resilient threaded sleeve portion of the nut is forced radially on to the threads of the bolt so that when the arrangement is subjected to vibration the resilient ring tends to absorb the vibrations while exerting pressure in the axial and radial directions of the bolt.

7. A nut and bolt assembly in which a split helicoidal member has a portion for exerting an inward radial force against a corresponding split portion of the nut to contract said split portion against the bolt.

8. A nut lock arrangement wherein a split resilient ring of substantially triangular cross section is adapted to co-operate with an annular groove in the nut of similar profile, one wall of the groove being parallel to and concentric with the axis of the nut and formed by a resilient threaded sleeve portion of the nut.

9. A nut lock arrangement comprising a ring adapted to co-operate with an annular groove in the nut of similar profile, the cross section of the ring being in the form of a right angled triangle with the vertical part in the interior and the hypothenuse on the outside, the vertical part co-operating with the cylindrical inner wall of the groove which is resilient and the hypothenuse with the outer wall of the groove which is rigid whereby the ring is contracted to press the sleeve portion around a plurality of threads of the bolt.

10. Means for maintaining a nut and bolt assembly in a condition to withstand the effect of vibrational forces which comprises resilient vibration absorbing means which when the nut is in seated position surrounds a resilient internally threaded sleeve portion of the nut and exerts radial pressure thereon.

11. In a nut and bolt assembly wherein the nut has a resilient internally threaded sleeve portion, the outer surface of which forms one wall of a groove, and a second surface inclined toward said outer surface forms the other wall of the groove, means for locking the nut to the bolt comprising an axially and radially resilient annular member positioned partly within the groove in spaced relation to the bottom thereof and in wedging engagement with both walls, said means maintaining the nut in spaced relation to the work.

12. In combination, a nut having a plurality of segments encompassing a bolt, a split elastic member engaging the segments and having at the split a locking edge, and means incuding the locking edge providing a dead lock between said bolt and nut, eliminating any tendency for unloosening.

13. A lock nut arrangement comprising a nut, a plurality of compressible sections thereon and a resilient helicoidal washer, said washer being split and its higher and lower terminals exerting a retaining action by pressing into the compressible sections of the nut and the work to be secured respectively.

14. A lock nut comprising at least a screw member, a locking member and an auxiliary locking member, the screw member having a threaded hole to engage a bolt and a plurality of compressible sections, the locking member being split and resilient and associated with the screw member, and the auxiliary member being adapted to grip the locking member.

15. A nut lock arrangement comprising a screw member having a threaded hole and a plurality of screw threaded compressible sections for engaging a bolt, a resilient split locking member adapted to surround and grip the compressible sections and an annular member adapted to grip the locking member, the locking and annular members co-operating to lock the nut to the bolt in spaced relation to the work.

16. A nut and bolt assembly in operative relation to a work piece comprising a nut having a split surface engaging the bolt, and a split helicoidal washer so positioned and associated with the nut and the work piece that when the assembly is subjected to vibrational forces one free edge of the washer at the split tends to penetrate into the surface of the work piece with which it engages and another free edge at the split tends to penetrate further into a cavity in the nut provided for this purpose whilst the walls of the cavity are so shaped as to resist such tendency to penetrate.

In testimony whereof I affix my signature.

AUDOIN D'HALLOY.